United States Patent
Huber et al.

(10) Patent No.: US 7,017,335 B2
(45) Date of Patent: Mar. 28, 2006

(54) METHOD AND DEVICE FOR DOSING A REDUCING AGENT FOR THE REMOVAL OF NITROGEN OXIDES FROM EXHAUST GASES

(75) Inventors: Sven Huber, Freilassing (DE); Hanspeter Mayer, Markt Piesting (AT); Gerhard Mueller, Freilassing (DE); Michael Offenhuber, Adnet (AT)

(73) Assignee: Robert Bosch GmbH, Stuttgart (DE)

( * ) Notice: Subject to any disclaimer, the term of this patent is extended or adjusted under 35 U.S.C. 154(b) by 123 days.

(21) Appl. No.: 10/381,310

(22) PCT Filed: Sep. 24, 2001

(86) PCT No.: PCT/DE01/03664

§ 371 (c)(1),
(2), (4) Date: Aug. 18, 2003

(87) PCT Pub. No.: WO02/24312

PCT Pub. Date: Mar. 28, 2002

(65) Prior Publication Data
US 2004/0047783 A1  Mar. 11, 2004

(30) Foreign Application Priority Data
Sep. 22, 2000  (DE)  .................. 100 47 519

(51) Int. Cl.
*F01N 3/00* (2006.01)

(52) U.S. Cl. .................... 60/286; 60/274; 60/285; 60/295; 60/303
(58) Field of Classification Search ............. 60/274, 60/276, 285, 286, 295, 303
See application file for complete search history.

(56) References Cited

U.S. PATENT DOCUMENTS

| | | | |
|---|---|---|---|
| 5,367,875 A | | 11/1994 | Aboujaoude et al. |
| 5,628,186 A | * | 5/1997 | Schmelz ............... 60/274 |
| 5,950,422 A | * | 9/1999 | Dolling ............... 60/274 |
| 6,063,350 A | | 5/2000 | Tarabulski et al. |
| 6,119,448 A | | 9/2000 | Emmerling et al. |
| 6,399,034 B1 | * | 6/2002 | Weisweiler ......... 423/213.2 |
| 6,408,619 B1 | * | 6/2002 | Wissler et al. ........... 60/286 |
| 6,442,932 B1 | * | 9/2002 | Hofmann et al. ......... 60/274 |

FOREIGN PATENT DOCUMENTS

DE  199 46 900  12/2000

* cited by examiner

Primary Examiner—Binh Q. Tran
(74) Attorney, Agent, or Firm—Kenyon & Kenyon

(57) ABSTRACT

A method and a device for metering a reducing agent is described, which is used for mass regulated metering of a reducing agent, in particular urea or a urea-water solution for the exhaust gas treatment of the exhaust gas of a diesel engine in particular. The device includes a mass sensor for measuring the reducing agent mass flow into the catalytic converter system.

21 Claims, 2 Drawing Sheets

METHOD AND DEVICE FOR DOSING A REDUCING AGENT FOR THE REMOVAL OF NITROGEN OXIDES FROM EXHAUST GASES

FIELD OF THE INVENTION

The present invention is directed to a method and a device for metering a reducing agent, in particular urea, or a urea-water solution, within the scope of a catalytic exhaust gas treatment.

BACKGROUND INFORMATION

In order to achieve a reduction of $NO_x$ components in exhaust gases, reduction-type catalytic converters have been developed, in particular for diesel engines, which are commonly subdivided into SCR catalytic converters ("selective catalytic reduction") and storage-type catalytic converters. SCR converters are regenerated by supplying a urea-based reducing agent and/or an ammonia-based reducing agent, while storage-type converters are regenerated during rich exhaust phases by using the entrained hydrocarbons of the engine fuel.

A device, which meters urea as a reducing agent for the removal of nitrogen oxides from exhaust gases, e.g., from a diesel engine, is known from German Published Patent Application No. 199 46 900. Metering takes place by using a valve which lets through doses of urea which are determined by the electrical control of the metering valve, its throttle cross section, and the pressure difference applied to the throttle valve. The pressure upstream from the valve is measured and is kept constant within a tolerance range.

SUMMARY OF THE INVENTION

The method according to the present invention and the metering device according to the present invention have the advantage over the related art in that they lower the metering tolerances to values below ±10%, e.g., to values of approximately ±5%. Series scattering, in particular of the throttle cross section, due to manufacturing tolerances of the bore diameter, as well as the inflow and outflow edges, may be compensated; temperature dependencies in the dosage, e.g., in the temperature range of –10° to +100° C., due to the temperature-dependent viscosity of the fluid or due to the change in length of the components as a result of temperature changes, may also be compensated. Also time drifts over the entire service life of the metering device (up to 10,000 hours of operation) may be compensated. By determining the mass, it is possible to provide a closed-loop control circuit and a closed-loop control method based on metering by detecting the metering mass flow, compiling the measured values by the control unit, and corrected control of the metering valve or of a metering pump. Thus it is possible to correct the actual values in the mass flow with the purpose of adjusting them to the setpoint values, thereby improving the metering accuracy. In addition, changes, influenced over time, may be detected and corrected. The metering tolerance is then only influenced by the measuring tolerance of the mass sensor, resulting in a substantial reduction in the number of components that influence the tolerance.

It is in particular advantageous if an essentially known mass sensor is used which, in addition to the mass flow, measures the density of the medium flowing through so that the working substance used and also the physical state(s) of the working substance(s) may be identified. By using an aqueous urea solution it is possible to decide on the density and concentration of the urea. Changes in the concentration may thus be compensated within specified limits by modified control of the metering valve. The metering accuracy is thereby further improved and, in the event of deviations from the normal concentration exceeding the tolerance value, an error message may be triggered via a warning display optionally connected to the control unit. Mistakes in application, e.g., the use of wrong working substances, e.g., water without a urea additive, or methanol, or fuel, may be detected and this information may be used for emergency shutdowns of the system or for error messages. Also phase changes in the reducing agent may be detected, e.g., the formation of vapor bubbles after degassing, ice formation after freezing, and a formation of air bubbles. The control unit may initiate appropriate venting and heating procedures, and a return line to the tank or a separate bleeder valve may be omitted.

The metered supply of the reducing agent is implemented in a particularly simple manner by using an appropriate electrically controllable metering pump, since a pump unit for the transportation of the urea is necessary anyway.

Furthermore, it is advantageous to provide an electrically controllable metering valve which may be electrically controlled by a control unit which in turn ensures mass-regulated metering, either alone or in combination with an appropriate control of the metering pump.

DETAILED DESCRIPTION

Figure 1:
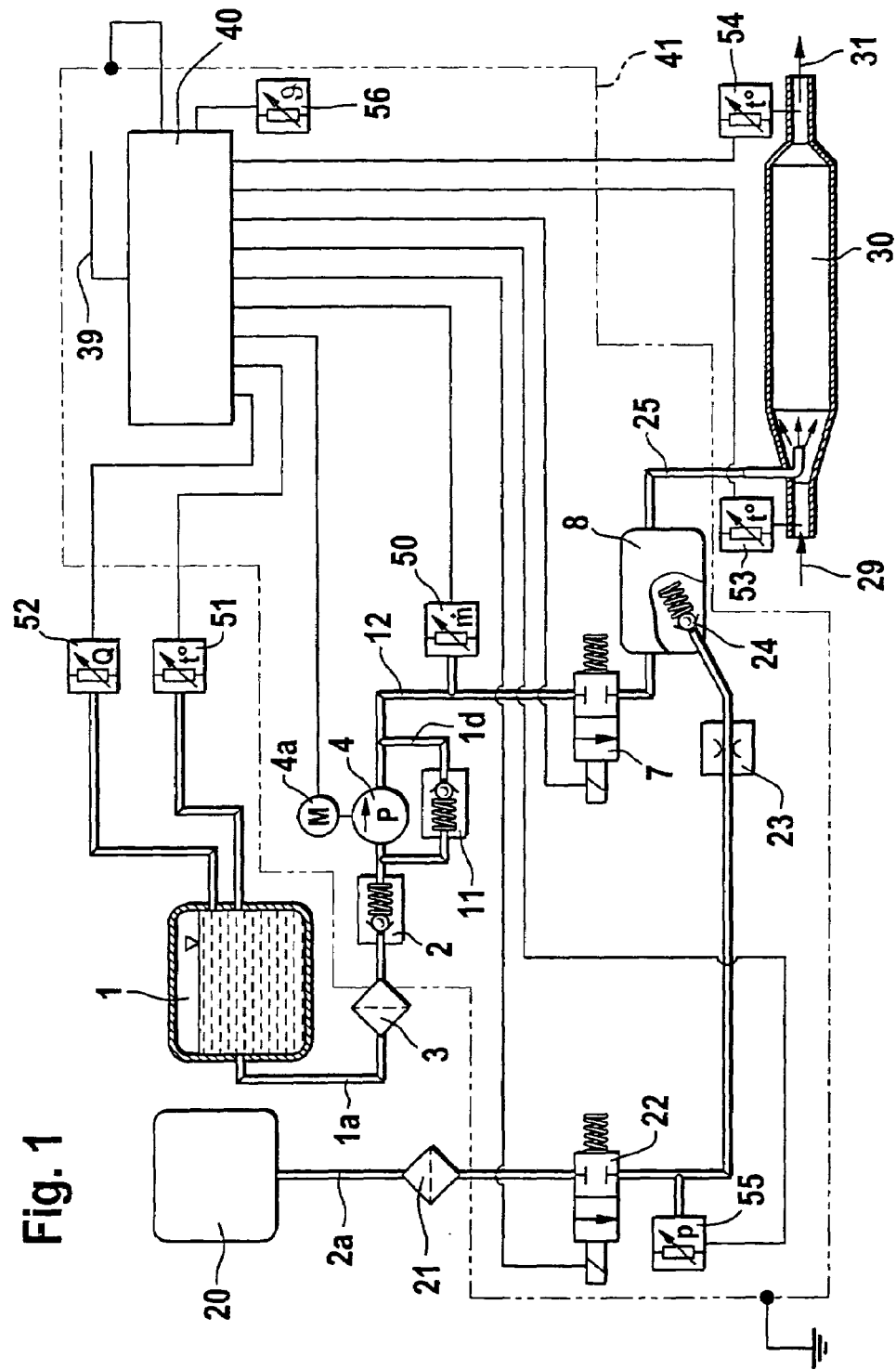
FIG. 1 shows a metering device which is connected to a water tank, a urea tank, and a catalytic converter system.

In FIG. 1 a urea tank is labeled 1 from which a urea-water solution is aspirated by a metering pump 4 via urea line 1a including check valve 2 and filter 3, designed as a filtering screen, and transported to a metering valve 7 of a mixing chamber 8. For minimizing the amount of overflow, pump 4 is speed-controlled by a pilot motor 4a. A pumped overflow is directed back to the suction side of the pump via a pressure relief valve 11. Compressed air from a compressed air container 20 is introduceable into the mixing chamber via an air line 2a including a filtering screen 21, a 2/2 directional control valve 22, a throttle 23, and a check valve 24. An aerosol line 25 runs from mixing chamber 8 to catalytic converter 30 which has an exhaust gas intake 29 on one side and an exhaust gas outlet 31 on the opposite side. Urea tank 1 is provided with a filling level sensor 52 and a temperature sensor 51. A mass sensor 50 is situated between metering pump 4 and metering valve 7. Temperature sensors 53 and 54 measure the exhaust gas temperature at the intake and the outlet of catalytic converter 30. In addition, a pressure sensor 55 is provided between 2/2 directional control valve 22 and throttle 23. A temperature sensor 56 measures the temperature of a metallic housing block 41 on which components, framed by the broken line and labeled with this reference number, are situated or integrated. In addition, a control unit 40 is attached to housing block 41 and is electrically connected to sensors 50 through 56, as well as to pilot motor 4a and metering valve 7. Housing block 41 is grounded; control unit 40 uses the electrical potential of housing block 41 as the reference potential. Control unit 40 is connected to the power supply and other electrical components in the motor vehicle, the engine control unit in particular, via a CAN data line 39. (CAN stands for "controlled area network".)

Metering valve 7 meters the required urea-water solution into mixing chamber 8. An aerosol and a wall film, generated in the mixing chamber by exposing the urea-water solution to the compressed air, are introduced into catalytic converter 30 via aerosol line 25. Control unit 40 detects signals which are received from a master engine control unit via CAN data line 39, as well as the signals from pressure, temperature, and filling-level sensors 51 through 56 which are known per se and are not further explained here. In addition, control unit 40 receives an electrical signal from mass sensor 50, resulting in the time-dependent mass flow rate of the reducing agent between metering pump 4 and metering valve 7. From the sensor information control unit 40 calculates a urea metered amount which is to be added to the exhaust gas streaming through catalytic converter 30. By utilizing known inductive and/or mechanical methods, mass sensor 50 measures the flow rate of the reducing agent via a defined flow cross section and generates an electrical signal proportional to the mass flow. With the aid of metering valve 7 and valve 22, control unit 40 regulates the urea-water solution pressure and the pressure in the air line. For this purpose, the control unit uses data of the engine operating state supplied by the engine control unit via data line 39, as well as the sensor data originating in the metering device and the catalytic converter. Mass sensor 50 identifies the mass of urea-water solution flowing through and relays the measured value also to the control unit so that the actual mass flow is detected via a closed-loop control circuit, and the control of metering valve 7 may be adjusted to the setpoint mass flow.

The metering device may alternatively also be used without compressed air support, i.e., without the use of components 20 through 24. The mass sensor may also be designed such that, in addition to the mass flow, it also determines the density of the medium flowing through the measuring cell. Such mass sensors are also known per se. If an aqueous urea solution is used as the flowing medium, then the concentration may be determined via the density by using such measuring elements. Changes in the concentration may be compensated within specific limits by changing the control of the metering valve, in that respective concentration correction curves are stored in control unit 40. The metering accuracy is thereby further improved, i.e., an error message may be triggered in the event of an excessively high or an excessively low concentration. In addition, the control unit may determine whether wrong working substances are used and it is able to utilize this information for emergency shutdowns of the system and error messages. Information about the density of the medium may also be used by the control unit for the purpose of detecting phase changes, e.g., vapor bubbles after degassing, ice formation after freezing, as well as air in the event of formation of air bubbles. The control unit may then initiate appropriate venting and/or heating procedures. Venting procedures may be executed via metering valve 7, and heating may be performed via heating elements (not illustrated) which are in thermal contact with housing block 41.

A commercially available mass sensor operating on the Coriolis principle may also be used as an alternative to a volume flow measurement through a defined flow cross section. An additional alternative is a scale design similar to an essentially known fuel scale which weighs a defined volume. It is also possible to design the mass sensor similar to a hot-wire air mass sensor which determines the mass flow via the cooling down of a heated wire induced by the flowing fluid. Furthermore, independent from the specific design of the mass sensor, a temperature sensor may be integrated in it which measures the temperature of the working substance and communicates it to the control unit so that the control unit is able to execute a temperature adjustment of the mass flow sensor in order to take the temperature dependency of the kinematic viscosity of the fluid into account.

Figure 2:
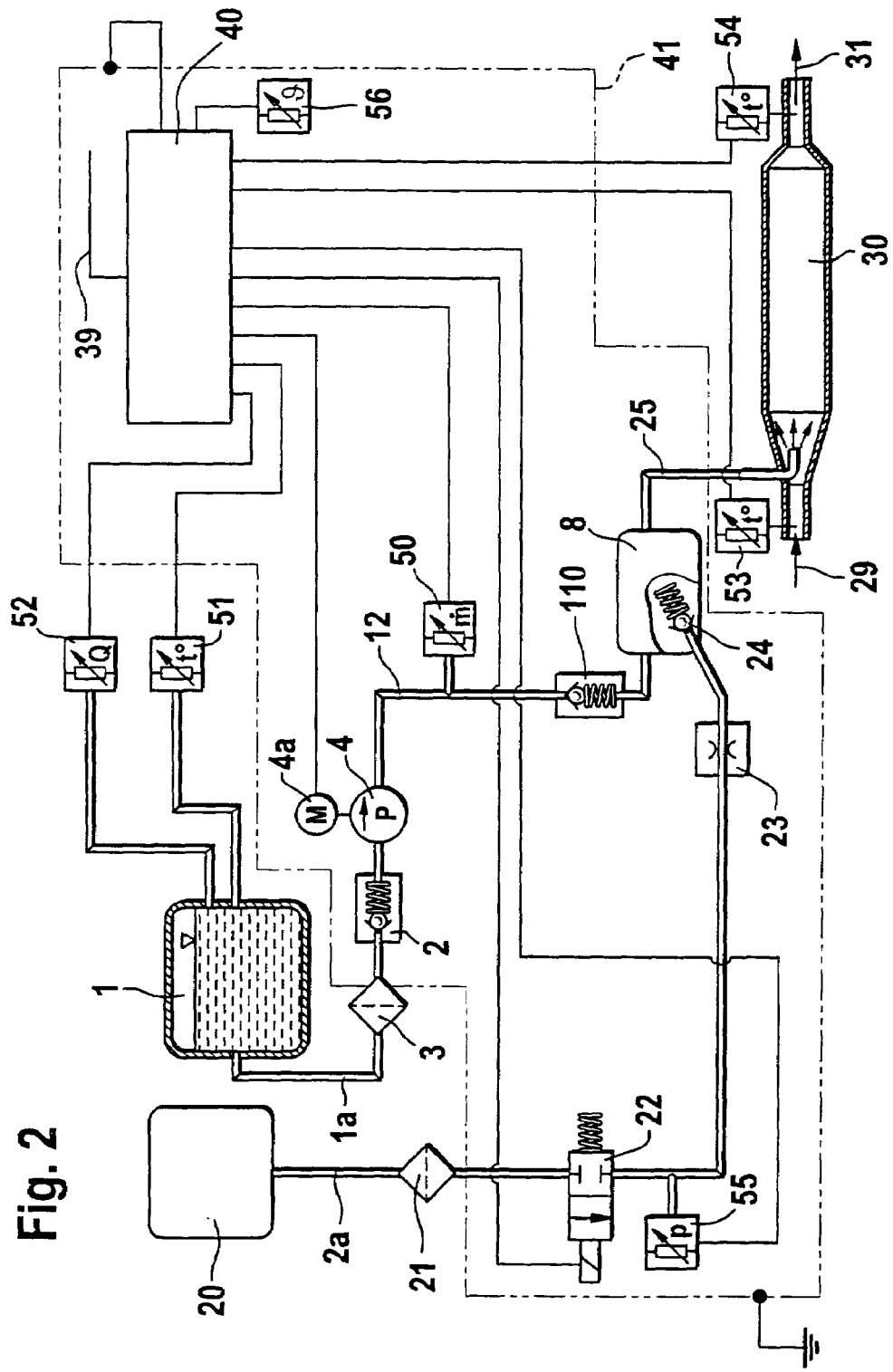
FIG. 2 shows a corresponding system using an alternative metering device.

FIG. 2 shows a further alternative embodiment in which the same components are referenced with the same reference numbers as in FIG. 1. In contrast to FIG. 1, pressure relief valve 11 is omitted and a check valve 110 is provided instead of metering valve 7.

In contrast to the system according to FIG. 1, this is a simplified embodiment in which metering takes place only via the metering pump.

What is claimed is:

1. A method of metering a reducing agent, comprising:
   supplying the reducing agent to a catalytic converter system for removing a nitrogen oxide from an exhaust gas;
   measuring a mass flow of the reducing agent;
   metering the reducing agent as a function of a magnitude of the mass flow;
   measuring a density of the reducing agent prior to being supplied to the catalytic converter system;
   determining a physical state of the reducing agent from the density measured; and
   one of degassing and heating the reducing agent if one of a gaseous phase and a solid phase is present.

2. The method as recited in claim 1, wherein:
   the reducing agent includes one of urea and a urea-water solution.

3. The method as recited in claim 1, wherein:
   the exhaust gas is from a diesel engine.

4. The method as recited in claim 1, wherein:
   the reducing agent is metered as a function of the density measured.

5. The method as recited in claim 1, further comprising:
   performing one of the following when the density measured is outside a predefined range:
   outputting an error message, and
   executing an emergency shutdown of a reducing agent supply.

6. The method as recited in claim 1, further comprising:
   forming an aerosol from the metered reducing agent; and
   subsequently introducing the aerosol into the catalytic converter system.

7. The method as recited in claim 6, further comprising:
   metering air to the reducing agent for forming the aerosol.

8. The method as recited in claim 1, wherein:
   the mass flow is measured by using the Coriolis effect.

9. The method as recited in claim 1, wherein:
   the mass flow is determined by measuring a flow rate of the reducing agent through a specified flow cross section.

10. The method as recited in claim 1, wherein:
    the mass flow is determined by performing a weight measurement.

11. A device for metering a reducing agent, comprising:
    an arrangement for supplying the reducing agent to a catalytic converter system for removing a nitrogen oxide from the exhaust gas;

at least one actuator; and a mass sensor for measuring a mass flow of the reducing agent into the catalytic converter system and being situated downstream from the arrangement for supplying the reducing agent, so that a mass regulated metering of the reducing agent may take place as a function of an electrical signal of the mass sensor via the at least one actuator, the mass sensor being capable of measuring a density of the reducing agent so that a physical state of the reducing agent may be determined from the density measured, and the reducing agent may be one of degassed and heated in the event of a presence of one of a gaseous phase and a solid phase.

12. The device as recited in claim 11, wherein:
the reducing agent includes one of urea and a urea-water solution.

13. The device as recited in claim 11, wherein:
the exhaust gas is from a diesel engine.

14. The device as recited in claim 11, wherein:
the arrangement includes an electrically controllable metering pump that is used as an actuator for mass regulated metering.

15. The device as recited in claim 11, further comprising:
an electrically controllable metering valve situated downstream from the mass sensor.

16. The device as recited in claim 11, wherein:
a supplying of the metered reducing agent supply into a mixing chamber takes place for forming an aerosol so that the aerosol may be introduced into the catalytic converter system via an aerosol line.

17. The device as recited in claim 16, further comprising:
an arrangement for metering an air supply into the mixing chamber.

18. The device as recited in claim 11, wherein:
the mass sensor operates on the Coriolis principle.

19. The device as recited in one of claim 11, wherein:
the mass sensor measures a flow rate of the reducing agent through a specified flow cross section.

20. The device as recited in claim 11, wherein:
the mass sensor performs a weight measurement.

21. The device as recited in claim 11, further comprising:
a control unit to which is connected the mass sensor; and
a CAN data line connected to the control unit, the control unit, by using the electrical signal, controlling the at least one actuator.

* * * * *